United States Patent
Brabham

(10) Patent No.: US 8,534,423 B1
(45) Date of Patent: Sep. 17, 2013

(54) TREE STAND AND MOUNTING MEMBER ASSEMBLY

(76) Inventor: D Scott Brabham, Pendleton, SC (US)

( * ) Notice: Subject to any disclaimer, the term of this patent is extended or adjusted under 35 U.S.C. 154(b) by 153 days.

(21) Appl. No.: 13/134,963

(22) Filed: Jun. 22, 2011

(51) Int. Cl.
*A01M 31/00* (2006.01)

(52) U.S. Cl.
USPC .......................................... 182/187; 182/188

(58) Field of Classification Search
USPC ................................................. 182/187, 188
See application file for complete search history.

(56) References Cited

U.S. PATENT DOCUMENTS

| | | | | |
|---|---|---|---|---|
| 4,727,961 A * | 3/1988 | Dawson | ......................... | 182/187 |
| 4,880,195 A * | 11/1989 | Lepley | ......................... | 248/219.4 |
| 5,199,527 A * | 4/1993 | Jennings | ......................... | 182/187 |
| 5,269,395 A * | 12/1993 | Lyzhoft et al. | ................. | 182/187 |
| 5,538,101 A * | 7/1996 | Kempf | ........................... | 182/116 |
| 7,174,995 B1 * | 2/2007 | Alexander | ................... | 182/187 |
| 7,690,481 B1 * | 4/2010 | Pederson | ...................... | 182/133 |
| 7,926,775 B1 | 4/2011 | Milazzo et al. | | |
| 2003/0178255 A1 * | 9/2003 | Auer | .............................. | 182/187 |
| 2007/0000726 A1 * | 1/2007 | Berkbuegler | ................. | 182/187 |
| 2011/0297481 A1 * | 12/2011 | Copus | ........................... | 182/113 |

OTHER PUBLICATIONS

EBSCO Industries, Inc.; Web site print out from http://www.summitstands.com/treestand-accessories/talon-bracket---single; visited Jun. 22, 2011; 1 page from website; publisher is EBSCO Industries, Inc.; city is Birmingham, Alabama, USA; copy enclosed; copyright 2011; copyright EBSCO Industries, Inc.; (1 page).

David Milazzo; Web site print outs from http://treestandbuddy.com/hunting/home.html; visited Jun. 22, 2011; 5 pages from website; publisher is David Milazzo; city is Ridge, New York, USA; copy enclosed; copyright 2011; copyright David Milazzo; (5 pages).

Predator Innovations, LLC; Web site print outs from http://www.hangonbuddy.com/default.htm: visited Jun. 22, 2011; 7 pages from website; publisher is Predator Innovations, LLC; city is Fogelsville, Pennsylvania, USA; copy enclosed; copyright 2011; copyright Predator Innovations, LLC; (7 pages).

Hunting Solutions, Inc.; Web site print outs from https://millenniumstands.com; visited Jun. 22, 2011; 4 pages from website; publisher is Hunting Solutions, Inc.; city is Pearl, Mississippi, USA; copy enclosed; copyright 2011; copyright Hunting Solutions, Inc.; (4 pages).

* cited by examiner

*Primary Examiner* — Alvin Chin Shue
(74) *Attorney, Agent, or Firm* — Metz Lewis Brodman Must O'Keefe LLC; Neal P Pierotti

(57) ABSTRACT

A tree stand and mounting member assembly is provided that has a base and mounting member that are releasably attachable to one another. First and second engagement members are included that have first and second female and male members. The first and second engagement members function to allow the mounting member to be releasably attachable to the base. The first engagement member does not engage the second engagement member and is spaced from the second engagement member in a vertical direction when the mounting member is attached to the base and the tree stand and mounting member assembly is mounted to a tree in a use configuration.

16 Claims, 9 Drawing Sheets

TREE STAND AND MOUNTING MEMBER ASSEMBLY

FIELD OF THE INVENTION

The present invention relates generally to a tree stand and mounting member assembly for use while hunting. More particularly, the present application involves a hanging tree stand and mounting bracket that can remain attached to a tree while the tree stand can be removed when not in use. This arrangement may assist in preventing theft and damage and to allow subsequent ease in remounting for reuse of the tree stand.

BACKGROUND

Tree stands are known for affording a hunter an elevated position to observe and fire upon game while hunting. A typical hanging tree stand may weigh on the order of 15-25 pounds and can be lifted by the user up into the tree and secured thereto via a plurality of straps. The hanging tree stand can include a seat onto which the user sits, and a platform onto which the user stands. The straps are positioned to extend around various components of the tree stand that are located proximate to the tree. As used herein, the term tree stand refers to a hanging tree stand although other types of tree stands are known such as climbing tree stands and ladder tree stands.

The size and configuration of these components along with the weight of the tree stand provide challenges to the hunter in climbing the tree and affixing the tree stand thereon in a safe and efficient manner. Once the user is done hunting, he or she must then remove the straps to unfasten the tree stand from the tree and descend to the ground. This procedure again requires care be taken by the user in manipulating the tree stand at a position elevated off of the ground. In order to avoid this constant removal and reattachment, the user could leave the tree stand in the tree without removing it once his or her hunt is finished. However, retention of the tree stand in the tree for extended periods of time subjects the tree stand to theft and to damage brought about by the elements such as sun, rain, snow and wind.

One solution to solve the problem of theft of portions of the tree stand involves the provision of a bracket that a user can attach to the tree via a strap. A complimentary hook or other matching bracket is attached to the tree stand by the user via a bolted connection. The user may then climb the tree and fasten the complimentary hook onto the bracket all ready on the tree so that the tree stand is more easily attached to and removed from the tree. However, such arrangements still allow the attached bracket on the tree to be stolen.

In addition, such arrangements require the user attach a complimentary hook or other matching bracket to his or her previously purchased tree stand. Aside from being difficult and potentially impossible to do on some tree stands, this act may function to void the warranty of the user's tree stand because he or she is altering the structure of the tree stand and its tree mounting instructions. Further, such arrangements suspend the tree stand from a single attachment location thus allowing the tree stand to swing left or right should a user place a foot proximate the side of a platform of the tree stand and place his or her weight thereon. Straps may be secured to the tree stand proximate to the platform and around the tree to prevent this twisting motion, but this solution requires the user to constantly attach and detach the strap when the tree stand is to be mounted and removed. As such, there remains room for variation and improvement in the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
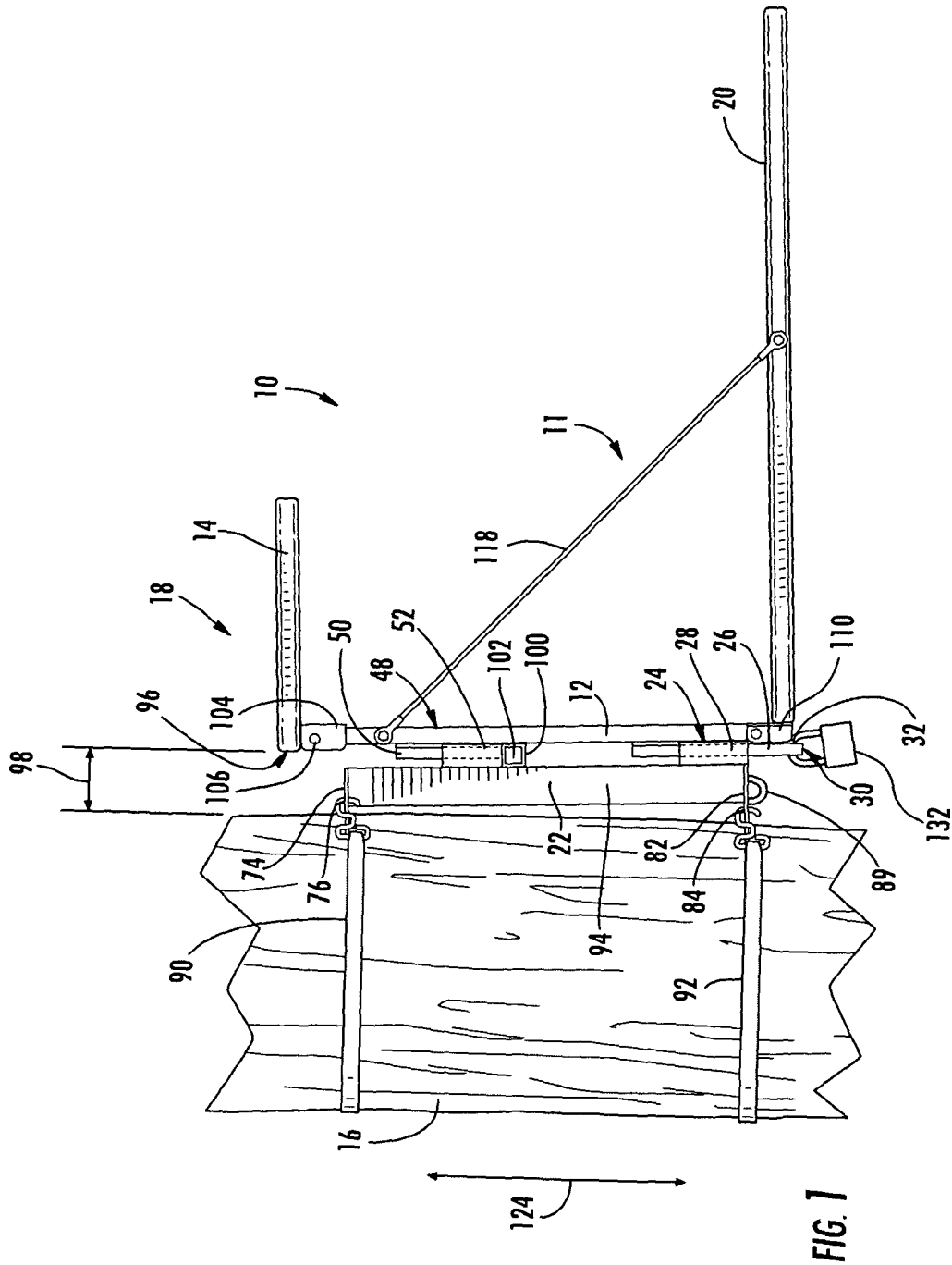
FIG. 1 is a side view of a tree stand and mounting member assembly mounted to a tree in a mounted use configuration in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a tree stand and mounting member assembly 10 that can be mounted to a tree 16 in a mounted use configuration 18 to afford a hunter an elevated position in which to observe or fire at wildlife. The tree stand and mounting member assembly 10 is convertible to a mounted non-use configuration 19 in which the tree stand 11 may be removed from a mounting member 22. The mounting member 22 may remain directly attached to the tree 16 through the use of one or more straps 90 and 92, while the tree stand 11 is removed by the hunter and taken out of the woods. The tree stand 11 may thus be protected from theft and the elements while the mounting member 22 and straps 90 and 92 remain in the tree 16 until the next hunting session. At such time, the hunter can climb the tree and reattach the tree stand 11 without having to attach any straps 90 and 92. Further, the tree stand and mounting member assembly 10 can be in the mounted use configuration 18 such that the only portion of the tree stand and mounting member assembly 10 directly attached to the tree 16 is the mounting member 22. The only portion of the tree stand and mounting member assembly 10 that the straps may directly contact is the mounting member 22, and no other portion of the tree stand and mounting member assembly 10 in the mounted use configuration 18. The seat 14 if present may be arranged so that its edge 96 closest to the tree 16 is located at least three inches from the tree 16. This arrangement may afford a more comfortable sitting position to the hunter in some arrangements of the tree stand and mounting member assembly 10.

An exemplary embodiment of the tree stand and mounting member assembly 10 is illustrated with reference to FIG. 1. The tree stand 10 is shown in a mounted use configuration 18 in which it is mounted onto a tree 16. The tree stand 11 includes a platform 20 and seat 14 attached to a base 12. The platform 20 is located below the seat 12 in the vertical direction 124. During use of the tree stand and mounting member assembly 10, the user may sit on the seat 14 and rest his or her feet on the platform 20. The user may stand up off of the seat 14 so that he or she is in a standing position with his or her feet on the platform 20 so that a better line of sight and/or shot is attained. The mounting member 22 is securely fastened to the tree 16 through the use of a pair of straps 90 and 92. The tree stand and mounting member assembly 10 can be arranged so that no straps or other fastening devices directly attach any portion of the tree stand and mounting member assembly 10 to the tree 16 besides the mounting member 22. In this regard, the straps or other fastening devices may not directly contact any component except for the mounting member 22. However, in other arrangements, the straps or other fastening devices may in fact contact other components of the tree stand and mounting member assembly 10 even though the only portion that is directly attached to the tree 16 is the mounting member 22. In yet other exemplary embodiments of the tree stand and mounting member assembly 10, additional components besides the mounting member 22, or in addition to the mounting member 22, may be directly attached to the tree 16. However, as disclosed in the exemplary embodiment in FIG. 1, the seat 14, base 12, and platform 20 of the tree stand 11 are not directly attached to the tree 16 but are rather indirectly attached to the tree 16 through the direct attachment of the mounting member 22 to the tree 16.

Figure 3:
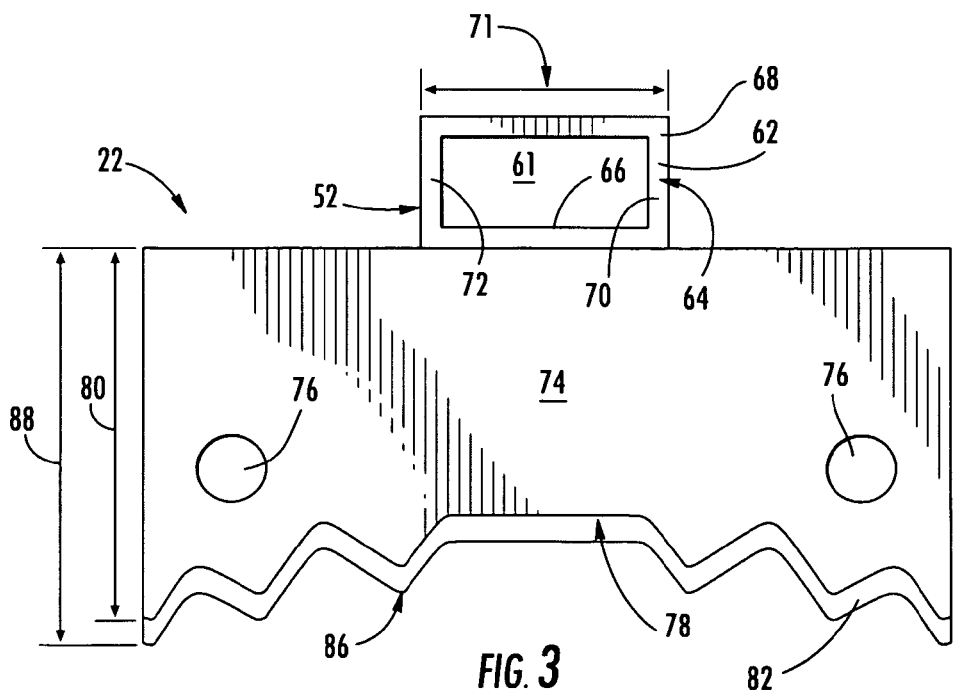
FIG. 3 is a top view of a mounting member of the tree stand of FIG. 1.
Figure 4:
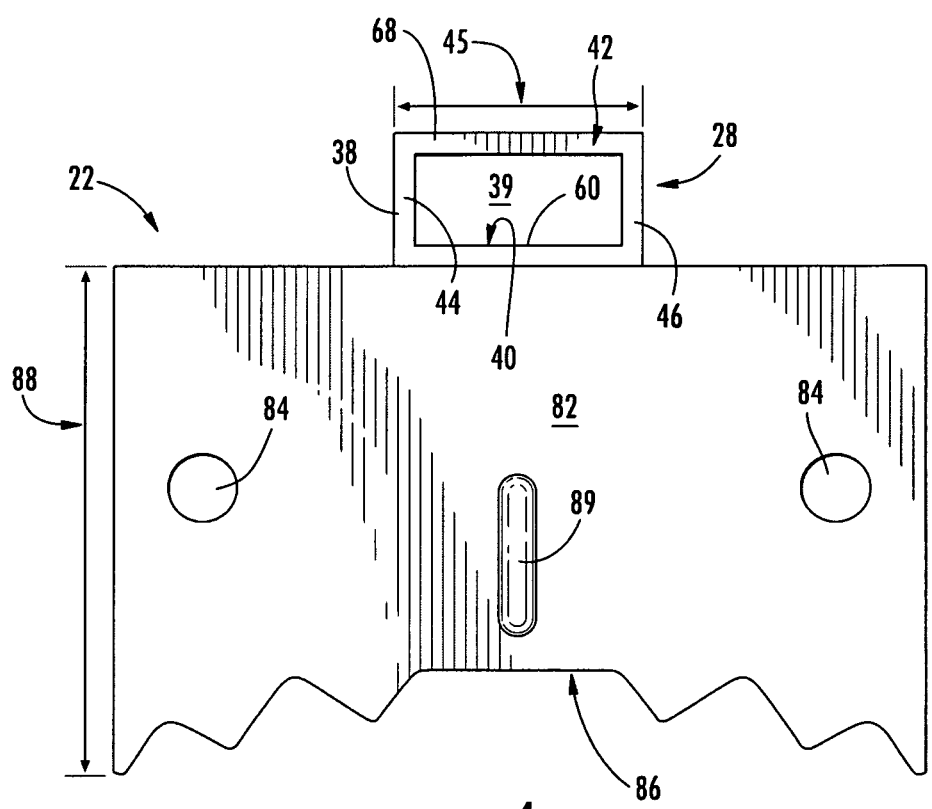
FIG. 4 is a bottom view of the mounting member of FIG. 3.
Figure 5:
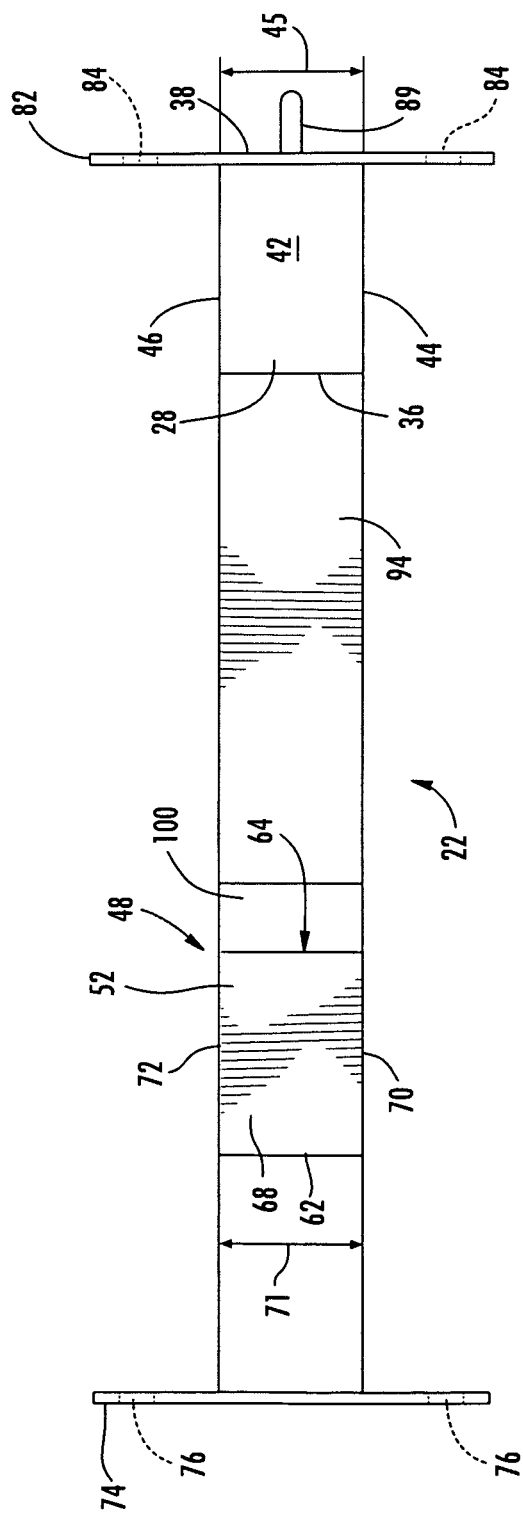
FIG. 5 is a front view of the mounting member of FIG. 3.

The mounting member 22 is shown in greater detail with reference to FIGS. 3-5. The mounting member 22 includes a body 94 that may be elongated and can have square tubular cross-sectional shape. A portion of a first engagement member 24 can be non-removably attached to the mounting member 22. The portion illustrated in the embodiment is a first female member 28 of the first engagement member 24, although it is to be understood that different portions of the first engagement member 24 may be non-removably attached to the mounting member 22 in other arrangements. The first female member 28 can be located at an end of the mounting member 22. The attachment between the first female member 28 and the mounting member 22 may be such that these two components are not capable of being physically separated from one another. For example, the first female member 28 may be welded onto the mounting member 22, or they can be integrally formed with one another so that they are a single, integral piece. The first female member 28 may be arranged so that it is not a bolted connection. In this regard, the first female member 28 may be permanently attached to the mounting member 22 such that these two components are provided to the end user as a single piece. The connection may be such that an end user does not have to make the connection, and such that an end user cannot disconnect these two components.

The first female member 28 may be arranged in the shape of a channel that is closed at its mouth 40. The first female member 28 includes a web 42 that is in the shape of a plate that can be square or rectangular. The web 42 can have a width 45 that is the same as the width of the mounting member 22. A pair of flanges 44 and 46 extend from the web 42 towards the body 94 of the mounting member 22 and engage the body 94. The flanges 44 and 46 may be in the shape of rectangular or square plates and can be welded or otherwise non-removably attached to the body 94. The flanges 44 and 46 may be perpendicular to the web 42.

An end 36 of the first female member 28 may be open such that a cavity is formed within at least a portion of the first female member 28. An opposite end 38 of the first female member 28 may likewise be open such that a through opening 39 is defined completely through the first female member 28. The through opening 39 can have a rectangular or square cross-sectional shape. The first female member 28 may thus be in the shape of a channel that has a closed mouth 40 that is closed by a surface of the mounting member 22.

A second female member 52 of a second engagement member 48 can be located on the mounting member 22 and may be spaced from the first female member 28 along the body 94. The female members 28 and 52 can be arranged so that they do not contact one another. The first and second female members 28 and 52 can be located on the same side of the body 94. The second female member 52 may be in the shape of a channel that has a mouth 66 that is closed by the presence of the side of body 94. The second female member 52 may have a web 68 that is a plate that is rectangular or square in shape. The web 68 may be the same size as the web 42, or may be longer in certain exemplary embodiments. A width 71 of the web 42 can be the same as the width 45 of the web 42 or may be bigger or smaller in accordance with certain exemplary embodiments. A pair of flanges 70 and 72 may extend downward from the web 68 and can engage the body 94 and may be non-removably attached to the body 94 through welding or though integral formation. The second female member 52 may thus be arranged so that it cannot be removed by the user from the mounting member 22. The second female member 52 may be permanently attached to the mounting member 22 and may not be attached by the end user, and may not be attached through the use of a bolted connection or some other connection that allows releasable attachment.

An end 62 of the second female member 52 may be open. In the disclosed embodiment, a through opening 61 extends from the end 62 all the way to an opposite end 64 of the second female member 52. The through opening 61 can have a square or rectangular shaped cross-section. The through opening 61 may be of the same size and shape as the through opening 39, or may be sized or shaped differently in accordance with various exemplary embodiments. The through opening 61 may extend in a direction that is parallel to the direction of extension of the through opening 39 such that these two openings 61 and 39 are in line with one another. The openings 39 and 61 may be parallel to one another, or perpendicular to one another in accordance with various exemplary embodiments.

The web 68 along with flanges 70 and 72 can be shaped in the form of a closed channel such that the mouth 66 of the channel is closed by the presence of the side of the body 94. The second female member 52 may have components that are configured in the same manner or manners as those previously described with respect to the first female member 52, and a repeat of this information is not necessary.

The mounting member 22 may also include a chain receiving member 100. The chain receiving member 100 can be provided so that it too is non-removably attached to the body 94 of the mounting member 22. The chain receiving member 100 can be configured so that it cannot be removed by the end user, and may be attached to the body 94 or other portion of the mounting member 22 through a welded connection or through integral formation. As disclosed, the chain receiving member 100 includes a pair of plates that are arranged in an "L" like configuration. One leg of the chain receiving member 100 engages the body 94, and the other leg engages the web 68 of the second female member 52. These legs of the chain receiving member 100 may be attached to their respective components by either welding, or integral formation, or by any other form of non-removable attachment.

An opening 102 is defined through the chain receiving member 100 and may extend completely therethrough. The opening 102 extends in a direction that is perpendicular to the through openings 39 and 61. The opening 102 may be a rectangular or square shaped opening, although others are possible. The opening 102 is defined by the two perpendicular L-shaped plates of the chain receiving member 100 and may be bound on two sides by the body 94 of the mounting member 22 and the end 64 of the second female member 52.

Figure 2:
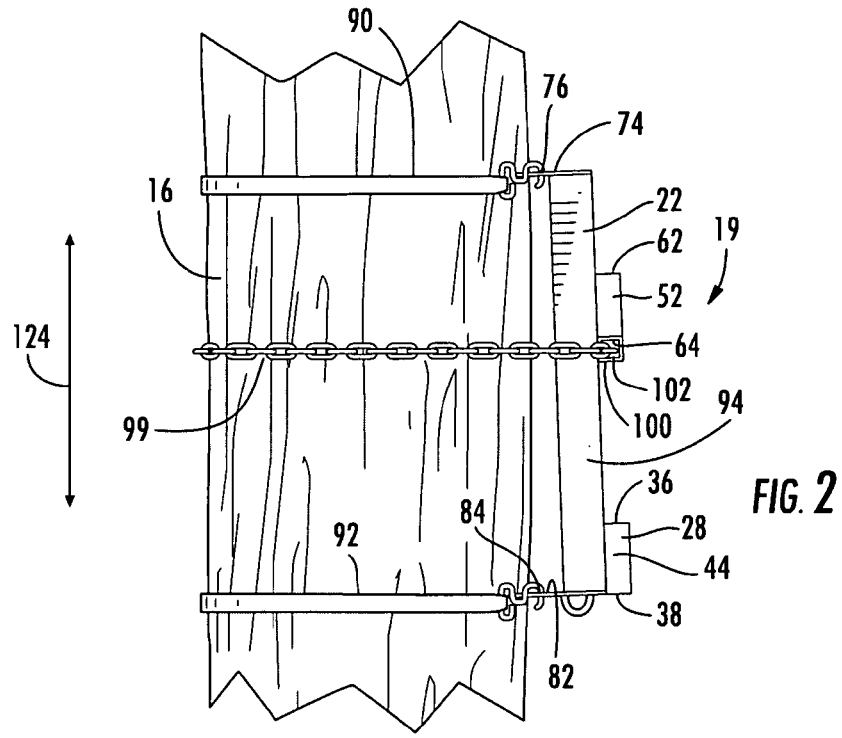
FIG. 2 is a side view of a mounting member mounted to a tree in a mounted non-use configuration.

With reference now to FIG. 2, the chain receiving member 100 is shown in a side view in which a chain 99 is inserted through the opening 102. The chain 99 may be a metal, linked chain or can be variously provided in other arrangements. The chain 99 may extend through the opening 102 and completely around the circumference of the tree 16. The chain 99 can be secured with a lock at its ends so that the mounting member 22 is in effect secured to the tree 16 to prevent theft of the mounting member 22. The user may insert the chain 99 through opening 102 once he or she is done hunting to effect this attachment. The chain 99 can be initially inserted after the base 12, seat 14, and platform 20 have been removed from the mounting member 22. The hunter can exit the woods with these components while leaving the mounting member 22 secured to the tree 16 and locked thereon through the use of the chain 99. The chain 99 may remain attached to the tree 16 and the mounting member 22 of the tree stand 10 while the user uses the tree stand 10 in the mounted use configuration 18, and when the user does not use the tree stand 11 in the mounted non-use configuration 19.

Although described as engaging the second female member 52, the chain receiving member 100 can be arranged differently in other embodiments. For example, it may be an aperture formed directly through the body 94 so that the entire opening 102 is defined by portions of the body 94. In other embodiments, the chain receiving member 100 includes three plates that are closed on a fourth side via the body 94 such that no portion of the chain receiving member 100 touches the'first female member 28 or the second female member 52. Also, although described as being on the same side of the body 94 as the female members 28 and 52, the chain receiving member 100 may be on a different side of the body 94. Still further, the chain receiving member 100 need not be present in accordance with other exemplary embodiments.

A first tree engagement member 74 may be located on one end of the body 94 so that the first tree engagement member 74 forms the terminal end of the mounting member 22. The first tree engagement member 74 may be a plate that has three straight edged sides that is arranged so as to completely cover a terminal end of the body 94. The first tree engagement member 74 may extend beyond the body 94 across three locations of the body 94. In other embodiments, the first tree engagement member 74 can extend beyond all four sides of the body 94 when the body 94 has a square or rectangular cross-sectional shape.

A jagged side 78 of the first tree engagement member 74 is located on one side of the first tree engagement member 74. The jagged side 78 includes a series of angled edges that that result in a series of peaks and troughs. Any number of peaks or troughs can be present. For example, from 2-10, from 11-20, or up to 30 peaks or troughs can be present in certain embodiments. The jagged side 78 engages the tree 16 when the mounting member 22 is placed into contact with the tree 16 and functions to provide a better grip to the tree 16 as the generally concave jagged side 78 is complimentary to the generally convex outer surface of the tree 16. A width 80 of the first tree engagement member 74 extends from the farthest terminal point of the jagged side 78 to an opposite side of the first tree engagement member 74. In effect, the width 80 is defined as the greatest distance of the first tree engagement member 74 between the side that is closest to the tree 16 and the side that is farthest from the tree 16 when the mounting member 22 is mounted to the tree 16. A pair of apertures 76 are defined completely through the first tree engagement member 74 and are each located on different sides of the body 94. The first tree engagement member 74 may be non-removably attached to the body 94 through integral formation or through the use of a welded attachment.

A second tree engagement member 82 is located on an opposite terminal end of the body 94 from the one that has the first tree engagement member 74. The second tree engagement member 82 may be arranged in a similar fashion as that of the first tree engagement member 74, and a repeat of this information is not necessary. The second tree engagement member 82 may again include a pair of apertures 84, three straight sides, and a fourth jagged side 86 that function in the same manner as previously described with respect to the first tree engagement member 74. The second tree engagement member 82 also has a width 88 that is defined in a manner similar to the width 80 of the first tree engagement member 74. However, the width 80 may be different than the width 88 in certain arrangements. For example, the width 88 may be greater than the width 80 such that the width of the second tree engagement member 82 is greater than the width of the first tree engagement member 74. In some exemplary embodiments, the width 88 may be four inches while the width 80 is three inches.

In use, the mounting member 22 can be mounted to the tree 16 in the mounted use configuration 18 such that both of the jagged sides 78 and 86 engage the tree 16. The second tree engagement member 82 is located vertically below the first tree engagement member 74 in the vertical direction 124. Due to the fact that the width 88 of the lower tree engagement member 82 is greater than the width 80 of the upper tree engagement member 74, the entire mounting member 22 is reclined backwards such that the surface of the body 94 pointing away from the tree 16 faces at an angle slightly upwards to the sky instead of slightly downwards to the ground. This orientation of the mounting member 22 will cause a resulting orientation of the seat 14 and platform 20 or other portion of the tree stand 11 that the user will sit, stand, or otherwise rest on during use. An upwardly inclined position may be more desirable because the user will feel more secure in the tree stand 11 as opposed to a downwardly declined position in which the user may have a sense of falling off of the tree stand 11 or a sense of sliding down or looking downwards sharply during use. However, it is to be understood that other embodiments exist in which the width 88 is equal to or less than the width 80 so that the tree stand and mounting member assembly 10 rests in a generally horizontal plane or is declined so that the platform 20 or seat 14 will extend outwards from the tree 16 in a downwardly inclined orientation.

The second tree engagement member 82 also includes a lifting lug 89 that can be mounted to the face of the second tree engagement member 82 that faces away from the body 94. The lifting lug 89 may be non-removably attached to the second tree engagement member 82 by way of integral formation or a welded connection. The lifting lug 89 may be attached at either end to form a closed opening, although a hook or other different shape is possible. The user may place a rope or other member through the lifting lug 89 in order to assist in lifting the mounting member 22 into the tree 16 during assembly of the tree stand and mounting member 10. In this regard, the hunter need not hold the mounting member 22 during ascent into the tree 16, but can simply take a rope or other member and subsequently lift the mounting member 22 once ready. Alternatively, once the mounting member 22 is mounted to the tree 16, the user can run a rope through the lifting lug 89 and attach the tree stand 11 to one end. The user may then stand on the ground and pull down on the rope in order to lift the tree stand 11 up into the tree 16. In this manner, the user need not carry the tree stand 11 into the tree 16 but instead can raise it simply by standing on the ground.

Figure 6:
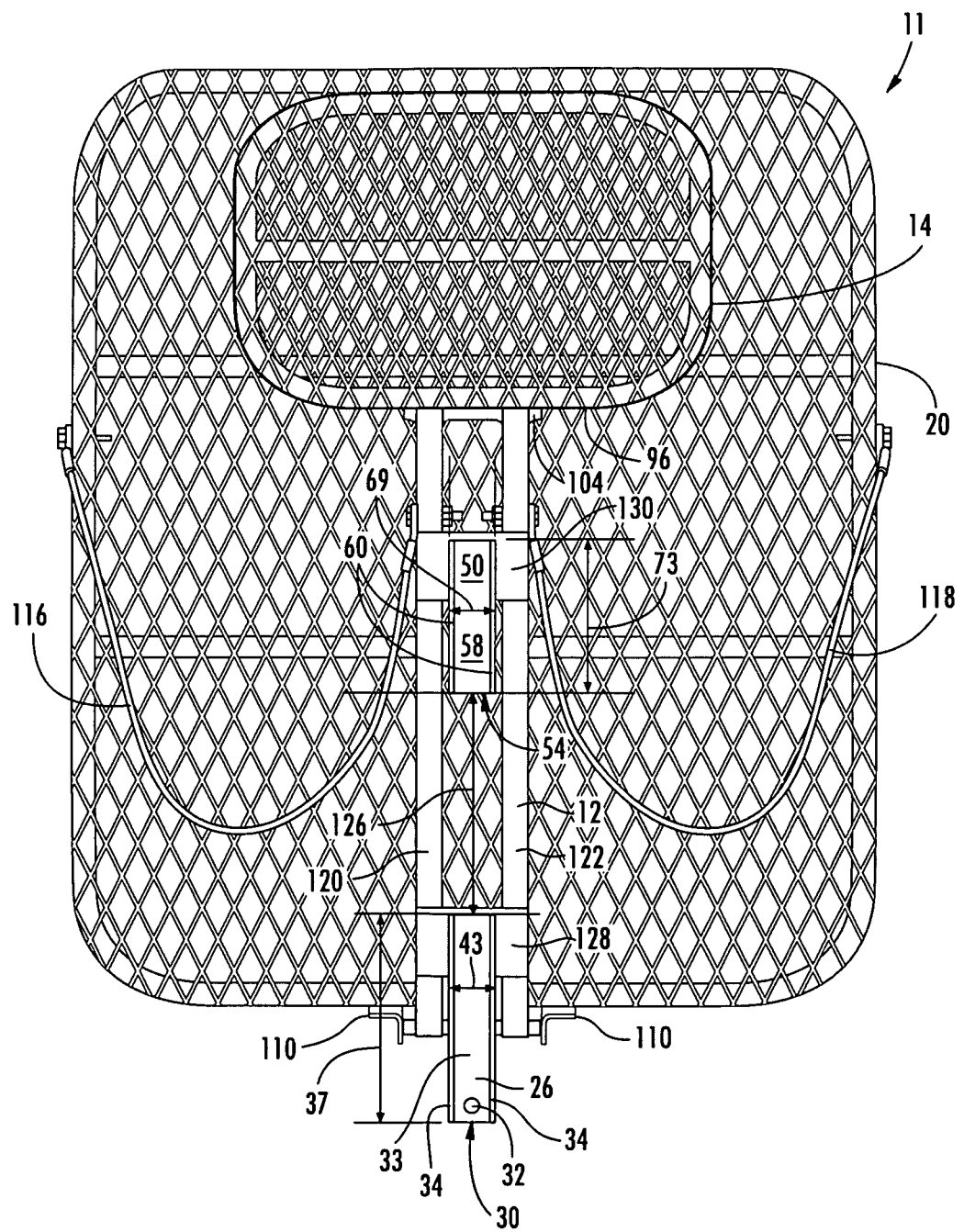
FIG. 6 is a top view of a tree stand with a base, seat, and platform that are pivoted with respect to one another from the view illustrated in FIG. 1.
Figure 7:
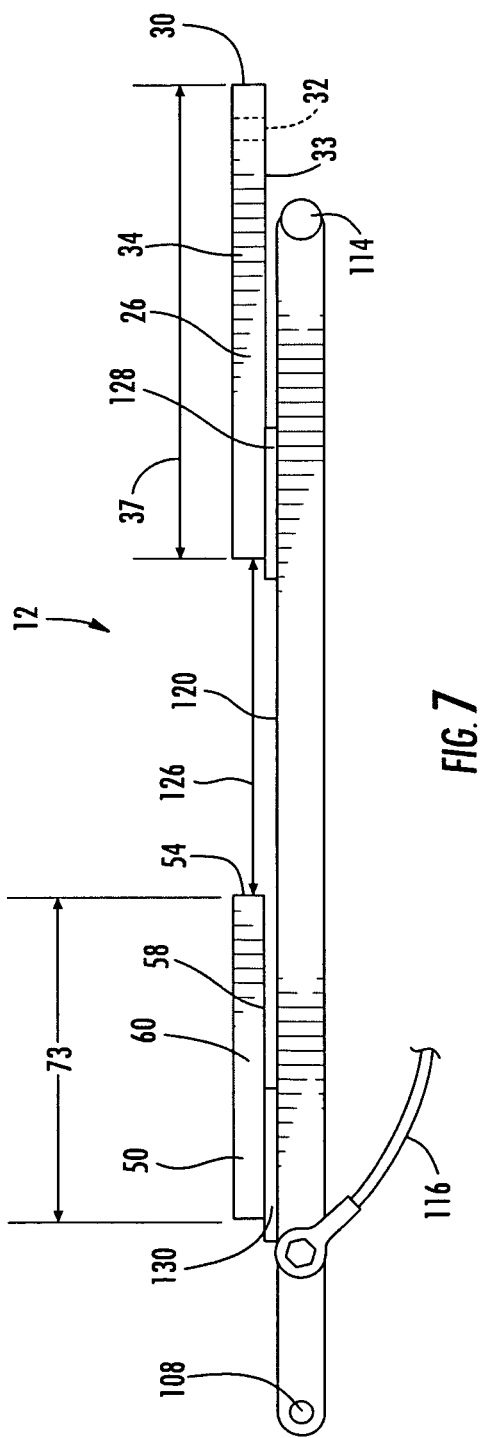
FIG. 7 is a side view of a base of the tree stand of FIG. 1.
Figure 8:
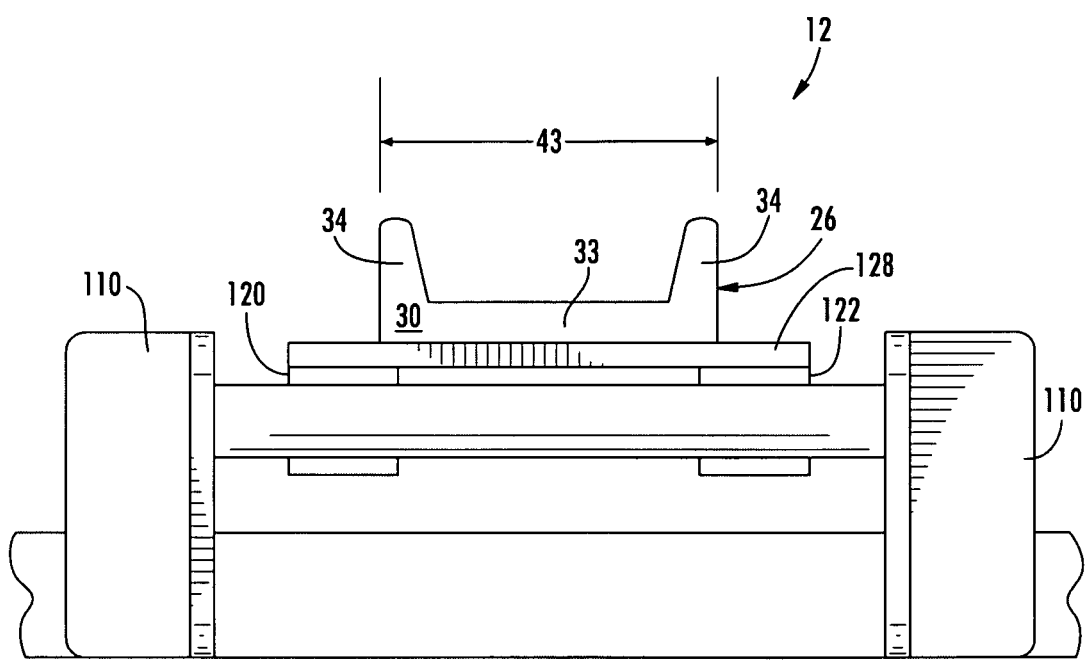
FIG. 8 is a bottom view of the base of FIG. 7.

A base 12 of the tree stand 11 is shown in greater detail with reference to FIGS. 6-8. The tree stand 11 may include the base 12, seat 14, platform 20, cable 116, and cable 118. A pair of tubular shafts 120 and 122 are included in the base 12 and are parallel to one another. The tubular shafts 120 and 122 may have a hollow square or rectangular cross-sectional shape. In accordance with other exemplary embodiments, instead of a pair of tubular shafts 120 and 122, the base 12 may have a plate that is a single, integral piece that extends width wise generally the same distance as does the opposite sides of the pair of tubular shafts 120 and 122. The base 12 carries additional portions of the first engagement member 24 and the second engagement member 48. As shown, a first male member 26 and a second male member are non-removably attached to the base 12. A cross plate 128 spans the distance between the tubular shafts 120 and 122 and is non-removably attached thereon through the use of welding or integral formation. The first male member 26 is non-removably attached to the cross plate 128 via welding or integral formation so that the first male member 26 is in turn non-removably attached to the tubular shafts 120 and 122 and hence base 12.

The first male member 26 is in the shape of an open channel and includes a web 33 and a pair of flanges 34 that extend upwards from the web 33. Each of the flanges 34 may be symmetrical to one another, identical to one another, or shaped differently from one another. An empty space is present between the flanges 34 and is open at its top but closed by the presence of the web 33 at its bottom. The flanges 34 can be variously configured in different arrangements and extend upwards from the web 33. The web 33 may be a rectangular or square flat plate such that an upper surface of the web 33 is flat. The first male member 26 is thus arranged in the shape of an open channel and can extend so as to have a length 37. The first male member 26 can be positioned on the cross-plate 128 so that the first male member 26 is not located right at the terminal end of the cross-plate 128 but is instead positioned somewhat inward from the terminal end of the cross-plate 128. The first male member 26 may extend so that it covers the rest of the length of the cross-plate 128 and extends beyond the cross-plate 128 so that its terminal end 30 is located beyond the terminal end of the base 12.

An aperture 32 can be defined through the web 33 and may be circular in shape. However, other shapes of the aperture 32 are possible in other arrangements. The aperture 32 can be spaced equal distance from the flanges 34 and thus may be located so that its axis is along a longitudinally extending centerline of the web 33. A width 43 of the first male member 26 may be defined so as to be the distance from the side of one flange 34 to the opposite side of another flange 34. The width 43 may also be the distance from one side of the web 33 to the opposite side of the web 33 since the flanges 34 extend upwards flush with these two sides of the web 33. The width 43 may thus be the maximum width of the first male member 26 taking into account any component of the first male member 26.

The flanges 34 need not extend upwards from the web 33, but may also extend downwards from the web 33. In yet other embodiments, one of the flanges 34 may extend upwards while the second flange 34 extends downwards. The flanges 34 may have various cross-sectional shapes and as shown in the disclosed embodiment have generally planar outer sides, curved upper tips, and generally planar inner sides that are not perpendicular to the upper surface of the web 33 but are in fact angled at some degree. In other versions of the tree stand and mounting member assembly 10, the first male member 26 does not include any flanges 34.

The tree stand 11 also includes a cross-plate 130 that is attached to both of the tubular shafts 120 and 122 of the base 12. The cross-plate 130 may be non-removably attached to the tubular shafts 120 and 122 via welding or through integral formation so that the cross-plate 130 is not capable of being detached by the user. A second male member 50 is non-removably attached to the cross-plate 130 so that the second male member 50 is non-removably attached to the base 12. The second male member 50 has a length 73 that extends from one terminal end to an opposite terminal end. The width 69 of the second male member 50 can extend in a direction perpendicular to its length 73 and may be the maximum width of the second male member 50. Also included are a pair of flanges 60 and a web 58. The components of the second male member 50 may be configured in various manners similar to those described above with respect to the first male member 26, and a repeat of this information is not necessary.

Differences between the male members 26 and 50 are present in the disclosed tree stand 11. In this regard, an aperture 32 is defined through the web 33 of the first male member 26, but a corresponding aperture is not present through the web 58 of the second male member 50 that lacks any apertures therethrough. Further, the length 73 of the second male member 50 is shorter than the length 37 of the first male member 26. The male members 26 and 50 can be arranged so that their widths 43 and 69 are the same and so that they are laterally positioned at the same point on base 12. In this regard, the upper surfaces of the webs 33 and 58 may be in line with one another and at the same height such that the channels formed by the first and second male members 26 and 50 are in line with one another but separated in their length direction. As shown, a terminal end 54 of the second male member 50 is located laterally between the tubular shafts 120 and 122 and longitudinally at some point in the interior of the base 12. The first male member 26 and the second male member 50 are separated from one another by a space 126. The magnitude of space 126 may be greater than the magnitude of the length 73. The space 126 may be from 2-4 inches, from 4-6 inches, from 6-12 inches, or up to 24 inches in certain exemplary embodiments. The heights of the first and second male members 26 and 50 may be the same such that the heights of the flanges 34 and 60 are the same.

The base 12 may carry additional components of the tree stand 11 such as the seat 14 and the platform 20. As shown with reference to FIGS. 1 and 7, a hollow end 108 of the base 12 forms a terminal end of the base 12. The hollow end 108 is attached to terminal ends of the tubular shafts 120 and 122. The hollow end 108 has a through opening that extends in a direction perpendicular to the lengths 37 and 73 of the male members 26 and 50, and parallel to the widths 43 and 69 of the male members 26 and 50. The seat 14 may include a pair of flanges 104 that are rigidly attached to other portions of the seat 14 and are positioned so that they are adjacent to and are on opposite ends of the hollow end 108. A pin 106 is disposed through the through opening of the hollow end 108 and is rigidly attached to the flanges 104. In this regard, the pin 106 may extend through holes of the flanges 104 and then be welded onto the flanges 104 so that a rigid connection is formed. The pin 106 and rigidly attached flanges 104 may rotate with respect to the hollow end 108. In this fashion, the seat 14 may be rotationally mounted on the base 12. However, it is to be understood that various arrangements may be used to rotationally mount the seat 14 onto the base 12 and that the disclosed embodiment in the drawings is only exemplary. Still further, other exemplary embodiments of the tree stand 11 are possible in which the seat 14 is rigidly mounted to the base 12, or in which a seat 14 is not present in the tree stand 11. The seat 14 may have a frame member that forms the outer perimeter of the seat and that is strengthened by a cross-member.

A metal mesh seating surface can be disposed over the framework of the seat 14 to provide a surface onto which a hunter can sit. Rain water may flow through the mesh seating surface to prevent a user from sitting in a pool of water that may have accumulated. However, it is to be understood that the seat 14 can be configured in a variety of different manners in other exemplary embodiments. The flanges 104 of the seat 14 are generally L-shaped members and engage the tubular shafts 120 and 122 of the base 12 when the seat 14 is located in a use position as illustrated in FIG. 1. Here, the engagement between the flanges 104 and the base 12 prevents the seat 14 from pivoting any further about the pin 106 and thus the pivotal location of the seat 14 with respect to the base 12 is limited and fixed. Pivoting of the seat 14 away from the position illustrated in FIG. 1 can be accomplished by simply lifting the seat 14 about pin 106. Rotation about pin 106 is limited in this opposite direction through engagement of an edge 96 of the seat 14 with the upper surfaces of the tubular shafts 120 and 122 of the base 12. FIG. 6 shows the seat 14 in a position when the edge 96 is just about to engage the tubular shafts 120 and 122 of the base 12. As such, the seat 14 can be pivoted a degree slightly greater than that shown in FIG. 6, and the pivotal range of the seat 14 about base 12 may be approximately 100° in the embodiment shown. However, other embodiments are possible in which the pivotal range of the seat 14 about base 12 may be from 45°-90°, from 90°-120°, from 120°-180°, or up to 360°.

An opposite end of the base 12 includes a hollow end 114 that forms a terminal end of the base 12. The hollow end 114 is used to form a rotational engagement between the base 12 and the platform 20. Reference may now be made to FIGS. 1 and 6-8 to illustrate this engagement. The hollow end 114 has a through opening that extends in a direction parallel to the widths 43 and 69 and that extends in a direction perpendicular to the lengths 37 and 73 of the first and second male members 26 and 50. A pair of flanges 110 can be rigidly attached to the platform 20 through welding or via integral formation. The flanges 110 can be positioned immediately adjacent opposite ends of the hollow end 114 such that the hollow end 114 is located between the flanges 110. A pin 112 may extend through the through opening of the hollow end 114 and can be rigidly attached to the flanges 110 via welding, mechanical fasteners, adhesion or any other suitable attachment mechanism. The flanges 110 may have a through opening through which the pin 112 is disposed in this regard. The hollow end 114 can pivot about the pin 112, which is rigidly attached to flanges 110. The platform 120 is rigidly attached to the flanges 110 and thus is made so as to be rotationally attached to the base 12. It is to be understood that the design illustrated in the drawings for rendering the platform 20 rotationally attachable to the base 12 is but one example and that others are possible in other arrangements. Further, in still other embodiments the platform 20 may be rigidly attached to the base 12 and need not pivot with respect to the base 12.

The platform 20 may have a frame member that forms the outer perimeter of the platform 20 and that is strengthened by a pair of cross-members. A metal mesh standing surface can be disposed over the framework of the platform 20 to provide a surface onto which a hunter can stand, rest his or her feet, or place objects thereon. However, it is to be understood that the platform 20 can be configured in a variety of different manners in other exemplary embodiments.

The platform 20 can rotate with respect to the base 12 so that these two components contact one another. However, in some arrangements, the platform 20 upon being pivoted towards the base 12 may first engage the flanges 104 of the seat 14 such that further pivoting towards the base 12 is prevented. In effect, the flanges 104 or other portion of the seat 14 may limit rotational movement of the platform 20 towards the base 12. Opposite rotational movement of the platform 20 can be limited by a pair of cables 116 and 118 as shown with reference to FIGS. 1 and 10. Cable 116 may be rotationally or rigidly attached to a side of the framework of platform 20 and to a side of tubular shaft 120. Cable 118 may be rotationally or rigidly attached to an opposite side of the framework of platform 20 and to a side of the tubular shaft 122. Rotation of the platform 20 away from the base 12 will occur until the cables 116 and 118 are extended to their full lengths at such time they will be tensioned and function to prevent further rotation of the platform 20 and in effect hold the platform 20 in the position illustrated in FIGS. 1 and 10.

The platform 20 may be positioned so that its upper surface is essentially parallel to the ground and in effect perpendicular to the vertical direction 124. The platform 20 can be held in this position via the cables 116 and 118 alone such that other components are not used to effect this holding. Although shown as being limited via cables 116 and 118, various types of pivoting limiting and holding components can be used in other exemplary embodiments. Rotation of the platform 20 in the opposite direction may be made by lifting the platform 20 such that slack is introduced into the cables 116 and 118 as shown for example in FIG. 6. The cables 116 and 118 may thus function to limit rotation of the platform 20 about the base 12 in one direction but not in an opposite direction. The platform 20 may have a range of rotation about the base 12 from 45°-80°, from 80°-120°, or up to 180° in various exemplary embodiments.

Figure 10:
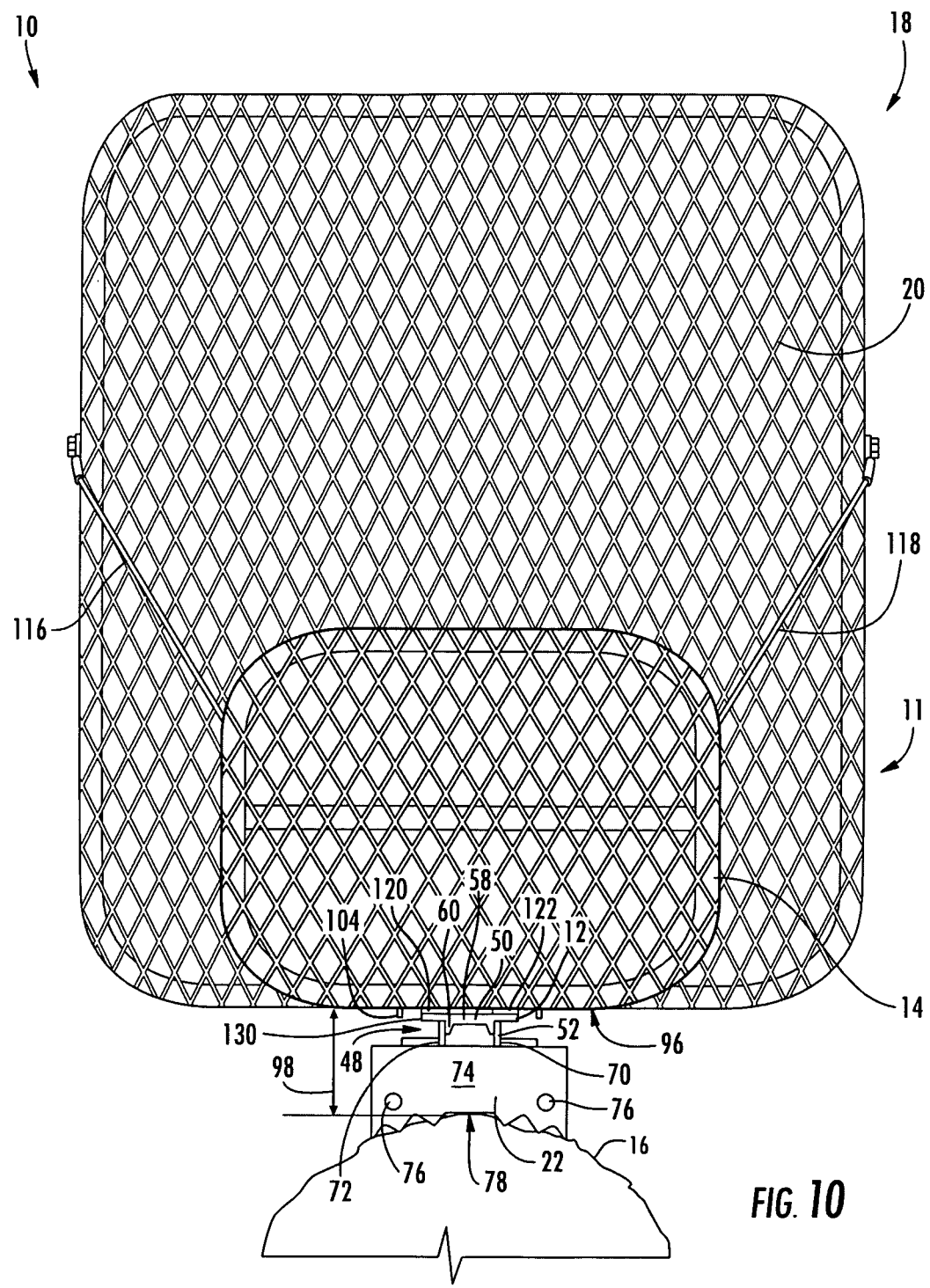
FIG. 10 is a top view of the tree stand and mounting member assembly mounted to the tree in the use configuration.

FIG. 10 illustrates the tree stand and mounting member assembly 10 affixed to the tree 16 and oriented into a mounted use configuration 18. The jagged side 78 of the first tree engagement member 74 contacts the tree 16. Although not shown, the jagged side 86 of the second tree engagement member 82 will likewise contact tree 16. The widths 80 and 88 of the tree engagement members 74 and 82 will effect the minimum distance between the tree 16 and the seat 14. The seat 14 has an edge 96 that is the surface of the framework of the platform forming the sitting portion of the seat 14 that is closest to the tree 16. The edge 96 may be a side edge or side surface of the framework forming the sitting portion of the seat 14, and thus may not be the flanges 104. The edge 96 may be located at the portion of the seat 14 that is closest to the tree 16 that the user can utilize while sitting on the seat 14. In use, the user will sit on the seat 14 such that his or her back is against the tree 16. Such position may be made more comfortable should the seat 14 be spaced away from the tree 16 so that the back of the user is not in a vertical orientation immediately adjacent the tree 16. However, such outward spacing may create a larger bending moment of the tree stand and mounting member assembly 10 about the tree 16 since the weight of the tree stand 11 and user is spaced away from the tree 16.

The jagged sides 78 and 86 are of roughly concave shape, and the inner most portion of the jagged sides 78 and 86 represent the closest position the tree 16 could possibly be with respect to the seat 14. A distance 98 is thus defined from the edge 96 to the tree 16, which may be the distance from the edge 96 to the inner most portion of the jagged sides 78 and 86. The distance 98 may be three inches. In other arrangements, the distance 98 may be at least 3 inches, may be at least 4 inches, may be at least 5 inches, or may be from 5-12 inches. In yet other exemplary embodiments, the distance 98 may be from 0.25 inches to 3 inches. Applicant has unexpectedly discovered that by having the distance 98 be at least 3 inches provides a comfortable sitting position for the user over an extended amount of time without placing strain onto the tree stand and mounting member assembly 10 that functions to bend or damage components of the tree stand and mounting member assembly 10 via a bending moment. However, it is to be understood that the distance 98 may be of other magnitudes not at least 3 inches in accordance with other exemplary embodiments.

With reference to FIG. 1, the tree stand and mounting member assembly 10 is shown in a mounted use configuration 18 to tree 16 is shown. An additional feature of the tree stand and mounting member assembly 10 can be more fully described. In the mounted use configuration 18, the first engagement member 24 makes up the lowest point of the tree stand and mounting member assembly 10 in the vertical direction 124. In particular, the terminal end 30 of the first male member 26 is the lowest point of the tree stand and mounting member assembly 10 in the vertical direction 124. The aperture 32 is thus located vertically below other components of the tree stand and mounting member assembly 10 such as the base 12, seat 14, and platform 20. A user may place a lock 132 through the aperture 32 and lock the lock 132. The lock 132 may prevent a thief from moving the tree stand 11 upwards with respect to the mounting member 22 so that the thief cannot disengage the mounting member 22 from the tree stand 11 to steal the tree stand 11. The functioning of lock 132 in preventing disengagement of the mounting member 22 from the base 12 will be discussed below in greater detail.

In use, the user may ascend the tree 16 and pull the mounting member 22 upwards via a rope attached to the lifting lug 89 or otherwise carry the mounting member 22 to the desired position in the tree 16. The mounting member 22 may be placed against the tree 16 and the user may insert a first strap 90 through the apertures 76 of the first tree engagement member 74 and a second strap 92 through the apertures 84 of the second tree engagement member 82. As previously discussed, a single strap or any number of straps may be used in other exemplary embodiments to secure the mounting member 22 to the tree 16. The straps 90 and 92 may be made of nylon, chain link, elastic material, or any other type of material. The resulting configuration of the tree stand and mounting member assembly 10 may thus be that as shown in FIG. 2 and described as a mounted non-use configuration 19. The chain 99 need not be present, although the user could place it through the chain receiving member 100 if desired before attachment of the base 12.

Next, the user may raise the tree stand 11 into the tree 16 up to the mounting member 22. The tree stand 11 may be lifted via a rope (with use of lifting lug 89 from the ground if desired) or other lifting device, or may be carried on the shoulder of a user via a shoulder strap that is attached to the base 12, seat 14, or platform 20. The user can position the base 12 proximate to the mounting member 22 and lower the base 12 so that the base 12 is held in position by the mounting member 22. The mechanism for this attachment resides in a first engagement member 24 and a second engagement member 48 that allow the base 12 to be releasably attached to the mounting member 22. The first engagement member 24 may be composed of the first male member 26 and the first female member 28. These two members 26 and 28 make up the first engagement member 24 and are non-removably attached to the base 12 and the mounting member 22. In this regard, the first engagement member 24 has a component that is non-removably attached to the base 12 and a component that is non-removably attached to the mounting member 22. The second engagement member 48 can be fashioned in a similar manner. Here, the second engagement member 48 is made up of a second male member 50 and a second female member 52. The second male member 50 is non-removably attached to the base 12, and the second female member 52 is non-removably attached to the mounting member 22. The second engagement member 48 thus includes a component that is non-removably attached to the base 12 and a component that is non-removably attached to the mounting member 22.

Figure 9:
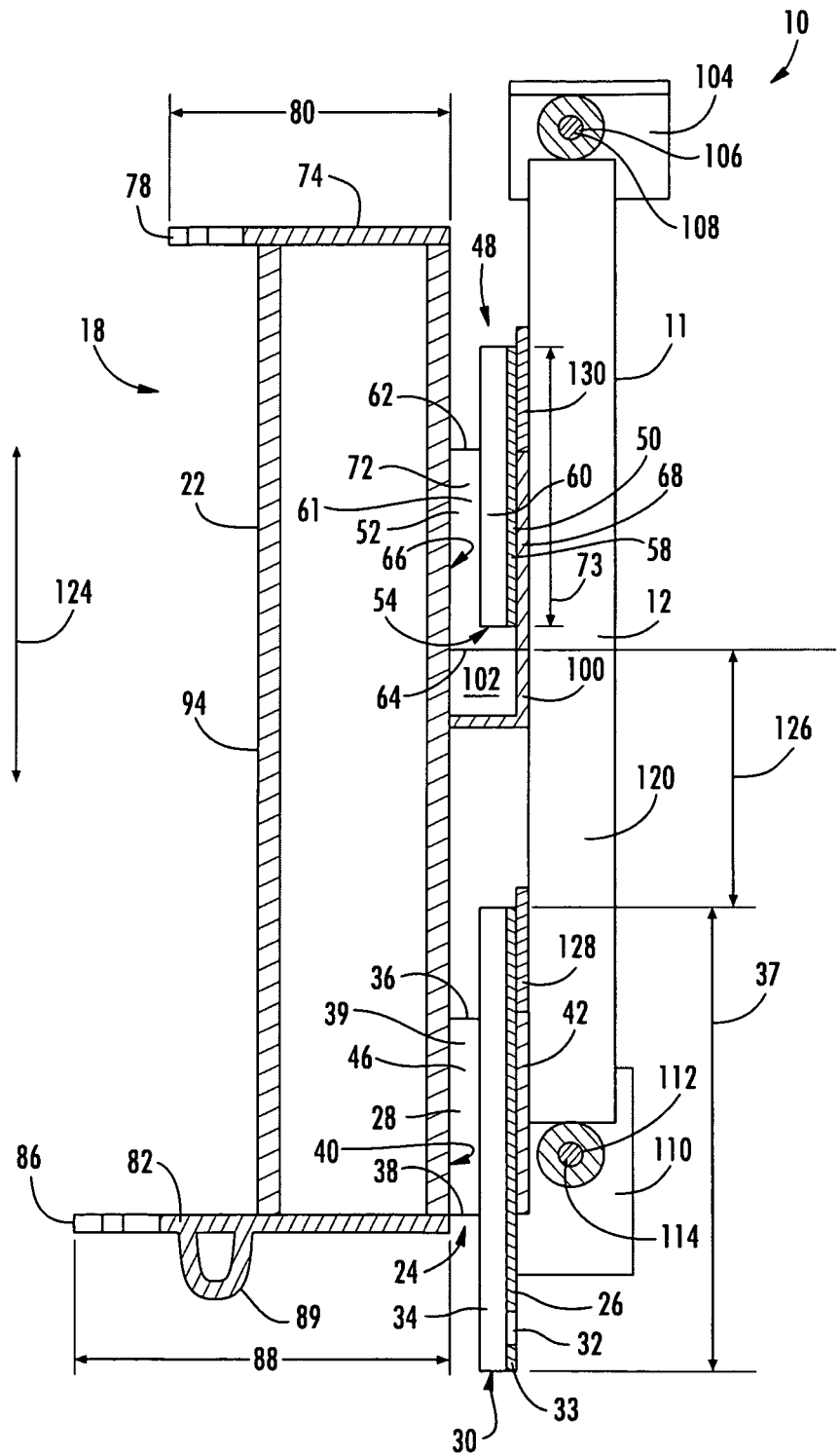
FIG. 9 is a cross-sectional view of the base and mounting member when they are attached to one another in a mounted use configuration of the tree stand and mounting member assembly.

With reference now to FIG. 9, the base 12 is positioned adjacent the mounting member 22 so that the first male member 26 is vertically between the chain receiving member 100 and the end 26 of the first female member 28. The second male member 50 is located above the end 62 of the second female member 52 in the vertical direction 124. The user will lower the base 12 so that the first male member 26 is positioned within the first female member 28 and so that the second male member 50 is likewise positioned within the second female member 52. The base 12 will be lowered into the position illustrated in FIG. 9. As one may note, the height of the first and second male members 26 and 50 does not fill the entire height of the first and second female members 28 and 52. This tolerance may be adjusted in other embodiments so that an engagement fit is realized. However, due to the weight imparted by the tree stand 11 and user residing on the tree stand 11, the connection is secured so that a tight tolerance of the components is not necessary. The attachment can be provided so that a lock is not used to cause the engagement members 24 and 48 to hold or secure the mounting member 22 to the base 12.

The base 12, and in effect the tree stand 11, is thus attached to the mounting member 22 but is not permanently attached thereto. The terminal end 30 of the first male member 26 is the lowest vertical portion of the tree stand and mounting member assembly 10 in the vertical direction 124. The length 37 of the first male member 26 is selected so as to allow this positioning of the terminal end 30, and thus the length 37 may be longer than the length 73 in some arrangements. The lock 132 may be disposed through the aperture 32. The presence of the lock 132 will function to block removal of the base 12 from the mounting member 22. In this regard, if the tree stand 11 is lifted upwards in the vertical direction 124, the lock 132 will engage the mounting member 22 either at the end 38 of the first female member 28 or at the second tree engagement member 82 and prevent further upward movement of the base 12. This locking feature may allow the tree stand 11 to be retained on the tree 16 in the mounted use configuration 18 when the user is not using the tree stand and mounting member assembly 10. A thief will be prevented from disengaging the base 12 from the mounting member 22. As such, the hunter can leave the tree stand and mounting member assembly 10 so that it remains in the mounted use configuration 18 while not actually in use. The tree stand and mounting member assembly 10 can be in this configuration for a matter of minutes, hours, days, or years until the next time the user returns. A chain 99 may be disposed through the opening 102 of the chain receiving member 100 to further secure attachment of the tree stand and mounting member assembly 10 to the tree 16.

Two straps 90 and 92 that are spaced from one another in the vertical direction 124 may secure the tree stand and mounting member assembly 10 in the mounted use configuration 18. The use of spaced straps 90 and 92 may provide a more secure connection because twisting of the tree stand and mounting member assembly 10 may be eliminated with such a design from the case in which a single strap is present. From 1-5, 6-10, or up to 15 straps can be used to attach the mounting member 22 to the tree 16. In use, once the hunter attaches the base 12 to the mounting member 22 and puts the platform 20 down, he or she will first step, usually onto a side, of the platform to get onto the tree stand 10. Placement of all of the weight of the hunter onto a side of the platform 20 may cause a twisting or bending moment thus potentially causing the tree stand 10 to swing sideways. Provision of a second strap 92 spaced from the first strap 90 in the vertical direction 124 may negate any bending of the tree stand and mounting member assembly 10 about the tree 16 in the side ways direction. Further, the fact that the second engagement member 48 is located below the first engagement member 24 in the vertical direction 124 may function to prevent the aforementioned twisting of the tree stand and mounting member assembly 10.

The user may detach the base 12 from the mounting member 22 by reversing the steps above. If a lock 132 was attached, the user will first remove the lock 132. Next, the user can lift the tree stand 11 in the vertical direction 124 so that the male members 26 and 50 are lifted up and out of the female members 28 and 52 such that the terminal ends 30 and 54 clear the ends 36 and 62 to allow the base 12 to be moved in a direction outward from the tree 16. The user can descend the tree 16 with the tree stand 11, or can first descend the tree 16 without the tree stand 11 and then subsequently lower the tree stand 11 through the use of the lifting lug 89. The mounting member 22 can remain attached to the tree 16 in the mounted non-use configuration 19 so that the next time the hunter wants to hunt in the tree stand and mounting member assembly 10, he or she need only bring the tree stand 11 into the tree 16 and attach same to the mounting member 22 without having to reattach any straps 90 or 92 or the mounting member 22.

As stated, the first and second engagement members 24 and 48 are non-removably attached to the base 12 and mounting member 22. The type of attachment may be permanent in that the user cannot remove these members 24 and 48 unless he or she uses a cutting torch or some other device that in fact destroys the tree stand and mounting member assembly 10. Such a configuration provides a more secure and safe attachment, especially when the user is located many feet up in a tree 16. Also, the user need not modify any currently owned equipment thus reducing user error and ensuring compatibility problems are eliminated.

The various components of the tree stand and mounting member assembly 10 can be made out of materials such as aluminum, steel, plastic, or wood. Also, although described as having the male members 26 and 50 of the first and second engagement members 24 and 48 located on the base 12, and the female members 28 and 52 of the first and second engagement member 24 and 48 located on the mounting member 22, this arrangement can be different in other embodiments. For example, some or all of the male members 26 and 50 may be non-removably attached to the mounting member 22, and some or all of the female members 28 and 52 may be non-removably attached to the base 12. Still further, although all of the male members 28 and 52 are shown as being on one component and all of the female members 28 and 52 being on a different component, in other versions of the tree stand and mounting member assembly 10 some of the female members and male members may be non-removably attached to the same component such as the mounting member 22, while some of the male members and female members may be non-removably attached to a different component such as the base 12. Also, although described as having two engagement members 24 and 48, other embodiments are possible in which any number of engagement members are present. For example, from 3-10 engagement members may be present in other embodiments, and they may or may not be all located at various points in the vertical direction 124 so that they are all spaced at the same or different distances from one another in the vertical direction 124.

The base 12 is releasably attachable to the mounting member 22 in that the user can attach these two parts to one another through insertion of the first male member 26 into the first female member 28 and insertion of the second male member 50 into the second female member 52. The user may remove and hence disengage the male members 26 and 50 from the female members 28 and 52 so that the base 12 is released from the mounting member 22. The male members 26 and 50 are not capable of being removed from the base 12, and the female members 28 and 52 are not capable of being removed from the mounting member 22. The first engagement member 24 and the second engagement member 48 are thus provided so that they are not removable from the base 12 and mounting member 22.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A tree stand and mounting member assembly, comprising:
    a base;
    a seat attached to the base, wherein the seat is configured to allow a user to sit thereon when the tree stand and mounting member assembly is mounted to a tree in a use configuration;
    a platform attached to the base, wherein the platform is configured to allow a user to stand thereon when the tree stand and mounting member assembly is mounted to the tree in the use configuration;

a mounting member that is releasably attachable to the base and that has a body; and a first engagement member that has a first portion that is non-removably attached to the body of the mounting member and that has a second portion that is non-removably attached to the base, wherein one of the first and second portions of the first engagement member is a first female member that has a planar surface, wherein the other one of the first and second portions of the first engagement member is a first male member that has a planar surface, wherein the planar surface of the first female member mates with the planar surface of the first male member in a non-rotatable manner when the first and second portions of the first engagement member are engaged with one another;

a second engagement member that has a first portion that is non-removably attached to the body of the mounting member and a second portion that is non-removably attached to the base, wherein one of the first and second portions of the second engagement member is a second female member that has a planar surface, wherein the other one of the first and second portions of the second engagement member is a second male member that has a planar surface, wherein the planar surface of the second female member mates with the planar surface of the second male member in a non-rotatable manner when the first and second portions of the second engagement member are engaged with one another;

wherein the first and second portions of the first engagement member and the first and second portions of the second engagement member disengage to allow the mounting member to be releasably attachable to the base;

wherein when the tree stand and mounting member assembly is mounted to the tree in the use configuration the mounting member is directly attached to the tree and to the base, and wherein when the tree stand and mounting member assembly is mounted to the tree in the use configuration the base, the seat, and the platform are not directly attached to the tree;

wherein the base is removable from the mounting member such that the mounting member remains directly attached to the tree and is not directly attached to the base, and wherein when so removed the base, the seat, and the platform are not attached to the tree;

wherein the second engagement member is spaced from the first engagement member and wherein the entire first and second engagement members are located at a same side of the body that faces away from the tree and has a surface normal with respect to the same side of the body that extends away from the tree and wherein the side of the body extends from the first engagement member to the second engagement member when the mounting member is mounted to the tree in the use configuration.

2. The tree stand and mounting member assembly as set forth in claim 1, wherein the first portion of the first engagement member is the first female member, and wherein the second portion of the first engagement member is the first male member.

3. The tree stand and mounting member assembly as set forth in claim 2,
wherein the first portion of the second engagement member is the second female member, and wherein the second portion of the second engagement member is the second male member;
wherein the first engagement member and the second engagement member are spaced from one another and do not engage one another when the mounting member is directly attached to the base and the tree stand and mounting member assembly is mounted to the tree in the use configuration.

4. The tree stand and mounting member assembly as set forth in claim 3, wherein the first male member is longer than the second male member, wherein the first male member has an aperture that extends therethrough, and wherein a terminal end of the first male member is located below the platform when the tree stand and mounting member assembly is mounted to the tree in the use configuration.

5. The tree stand and mounting member assembly as set forth in claim 4, wherein the first male member and the second male member are both in the shape of an open channel, wherein the first female member is in the shape of a channel with open opposite ends and a closed mouth, and wherein the second female member is in the shape of a channel with at least one open end and a closed mouth.

6. The tree stand and mounting member assembly as set forth in claim 1, wherein the mounting member has a first tree engagement plate located on one end that has a plurality of apertures therethrough, wherein the first tree engagement plate has a jagged side that engages the tree and a first strap is disposed through the plurality of apertures of the first tree engagement plate when the tree stand and mounting member assembly is mounted to the tree in the use configuration;
wherein the mounting member has a second tree engagement plate located on an opposite end from the first tree engagement plate that has a plurality of apertures therethrough, wherein the second tree engagement plate has a jagged side that engages the tree and a second strap is disposed through the plurality of apertures of the second tree engagement plate when the tree stand and mounting member assembly is mounted to the tree in the use configuration, wherein the second tree engagement plate has a width that is greater than a width of the first tree engagement plate;
wherein the mounting member has a square tubular body that extends between the first tree engagement plate and the second tree engagement plate.

7. The tree stand and mounting member assembly as set forth in claim 1, wherein when the tree stand and mounting member assembly is mounted to the tree in the use configuration the seat is at least three inches away from the tree.

8. The tree stand and mounting member assembly as set forth in claim 1, wherein the mounting member has a chain receiving member that defines an opening therethrough.

9. The tree stand and mounting member assembly as set forth in claim 1, wherein the seat is pivotally attached to the base such that the seat is capable of pivoting with respect to the base, wherein the platform is pivotally attached to the base such that the platform is capable of pivoting with respect to the base, and further comprising a pair of cables that are attached to the base and the platform, wherein the pair of cables function to provide a limitation to the degree of pivoting between the base and the platform.

10. A tree stand and mounting member assembly, comprising:
a base;
a mounting member that is releasably attachable to the base; and
a first engagement member that has a first female member and a first male member;
a second engagement member that has a second female member and a second male member, wherein the first engagement member and the second engagement member function to allow the mounting member to be releasably attachable to the base;

wherein when the mounting member is attached to the base and the tree stand and mounting member assembly is mounted to a tree in a use configuration the first engagement member does not engage the second engagement member and is spaced from the second engagement member in a vertical direction;

wherein the base has a pair of tubular shafts, wherein the first male member is attached to a first plate that is attached to the pair of tubular shafts, and wherein the second male member is attached to a second plate that is attached to the pair of tubular shafts;

wherein the mounting member has a first tree engagement plate located on one end that has a plurality of apertures therethrough, wherein the first tree engagement plate has a jagged side that engages the tree and a first strap is disposed through the plurality of apertures of the first tree engagement plate when the tree stand is mounted to the tree in the use configuration;

wherein the mounting member has a second tree engagement plate located on an opposite end from the first tree engagement plate that has a plurality of apertures therethrough, wherein the second tree engagement plate has a jagged side that engages the tree and a second strap is disposed through the plurality of apertures of the second tree engagement plate when the tree stand and mounting member assembly is mounted to the tree in the use configuration, wherein the second tree engagement plate has a width that is greater than a width of the first tree engagement plate;

wherein the mounting member has a square tubular body that extends between the first tree engagement plate and the second tree engagement plate.

11. The tree stand and mounting member assembly as set forth in claim 10, wherein:

the first male member has a web and a pair of flanges that extend from the web such that the first male member is in the shape of an open channel, wherein an aperture extends through the web of the first male member;

wherein the second male member has a web and a pair of flanges that extend from the web such that the second male member is in the shape of an open channel;

wherein the first female member has a web that has a width greater than a width of the first male member, and wherein the first female member has a pair of flanges that extend from the web of the first female member, and wherein the first female member has a through opening that extends from one end of the first female member to an opposite end of the first female member; and wherein the second female member has a web that has a width greater than a width of the second male member, and wherein the second female member has a pair of flanges that extend from the web of the second female member, and wherein the second female member has an open end.

12. The tree stand and mounting member assembly as set forth in claim 10, wherein a terminal end of the first male member is the lowest portion of the tree stand and mounting member assembly when the tree stand and mounting member assembly is mounted to the tree in the use configuration.

13. The tree stand and mounting member assembly as set forth in claim 10, further comprising:

a seat that is pivotally attached to the base such that the seat is capable of pivoting with respect to the base;

a platform that is pivotally attached to the base such that the platform is capable of pivoting with respect to the base; and a pair of cables that are attached to the base and the platform, wherein the pair of cables function to provide a limitation to the degree of pivoting between the base and the platform;

wherein the first male member has an aperture that extends therethrough, wherein the aperture of the first male member is located vertically below the seat and the platform when the tree stand and mounting member assembly is mounted to the tree in the use configuration.

14. The tree stand and mounting member assembly as set forth in claim 10, further comprising a seat that is attached to the base, wherein an edge of the seat that is closest to the tree when the tree stand and mounting member assembly is mounted to the tree in the use configuration is located at least three inches from the tree.

15. The tree stand and mounting member assembly as set forth in claim 10, further comprising:

a seat attached to the base; and a platform attached to the base;

wherein when the tree stand and mounting member assembly is mounted to the tree in the use configuration the mounting member is directly attached to the tree and to the base, and wherein when the tree stand is mounted to the tree in the use configuration the base, the seat, and the platform are not directly attached to the tree;

wherein the base is removable from the mounting member such that the mounting member remains directly attached to the tree and is not directly attached to the base, and wherein when so removed the base, the seat, and the platform are not attached to the tree.

16. A tree stand and mounting member assembly, comprising:

a base;

a mounting member that is releasably attachable to the base;

a first engagement member that has a first female member and a first male member;

a second engagement member that has a second female member and a second male member, wherein the first engagement member and the second engagement member function to allow the mounting member to be releasably attachable to the base;

wherein when the mounting member is attached to the base and the tree stand and mounting member assembly is mounted to a tree in a use configuration the first engagement member does not engage the second engagement member and is spaced from the second engagement member in a vertical direction;

wherein the first male member has a web and a pair of flanges that extend from the web such that the first male member is in the shape of an open channel, wherein an aperture extends through the web of the first male member;

wherein the second male member has a web and a pair of flanges that extend from the web such that the second male member is in the shape of an open channel;

wherein the first female member has a web that has a width greater than a width of the first male member, and wherein the first female member has a pair of flanges that extend from the web of the first female member, and wherein the first female member has a through opening that extends from one end of the first female member to an opposite end of the first female member;

wherein the second female member has a web that has a width greater than a width of the second male member, and wherein the second female member has a pair of flanges that extend from the web of the second female member, and wherein the second female member has an open end;

wherein the first male member is non-removably attached to the base;

wherein the second male member is non-removably attached to the base, and wherein the length of the web of the second male member is longer than the length of the web of the first male member;

wherein the mounting member has a body, and wherein the flanges of the first female member engage the body of the mounting member, and wherein the through opening of the first female member is rectangular in shape;

wherein the flanges of the second female member engage the body, and wherein the second female member has a through opening that extends from the open end of the second female member to an opposite end of the second female member; and wherein the mounting member has a chain receiving member that defines an opening therethrough that extends in a direction perpendicular to the through openings of the first and second female members, wherein the chain receiving member engages both the body of the mounting member and the second female member.

\* \* \* \* \*